United States Patent

[11] 3,544,009

| | | |
|---|---|---|
| [72] | Inventor | Francis Edward Schlueter<br>Des Moines, Iowa |
| [21] | Appl. No. | 808,168 |
| [22] | Filed | March 18, 1969 |
| [45] | Patented | Dec. 1, 1970 |
| [73] | Assignee | Deere & Company<br>Moline, Illinois<br>a corporation of Delaware |

[54] SPRAYER BOOM LEVELING AND FOLDING APPARATUS
12 Claims, 5 Drawing Figs.

[52] U.S. Cl. .................................................. 239/167,
239/159
[51] Int. Cl. .................................................. B05b 1/20
[50] Field of Search ........................................... 239/159,
161, 163, 164, 165, 166, 167, 168, 160, 162, 169, 170; 56/25

[56] References Cited
UNITED STATES PATENTS

| | | | |
|---|---|---|---|
| 2,628,128 | 2/1953 | Rhodeen ...................... | 239/168 |
| 2,712,198 | 7/1955 | Smith ........................... | 239/170X |
| 2,750,155 | 6/1956 | Nixon ........................... | 239/160 |
| 2,965,307 | 12/1960 | High ............................. | 239/307X |
| 2,995,307 | 8/1961 | McMahon ..................... | 239/166X |
| 3,177,638 | 4/1965 | Johnson ........................ | 56/25X |

*Primary Examiner*—Lloyd L. King
*Assistant Examiner*—Edwin D. Grant
*Attorneys*—H. Vincent Harsha, Harold M. Knoth, William A. Murray, John M. Nolan and Raymond L. Hollister ABSTRACT: The leveling and folding cylinders for a sprayer boom are connected in parallel to a single control valve. The folding linkage is designed to give the folding cylinder a greater load requirement then the leveling cylinder so that the folding cylinder operates last in the raise and fold cycle but first in the unfold and lower cycle.

Patented Dec. 1, 1970

3,544,009

INVENTOR.
FRANCIS E. SCHLUETER

BY
R L Hollister
ATTORNEY

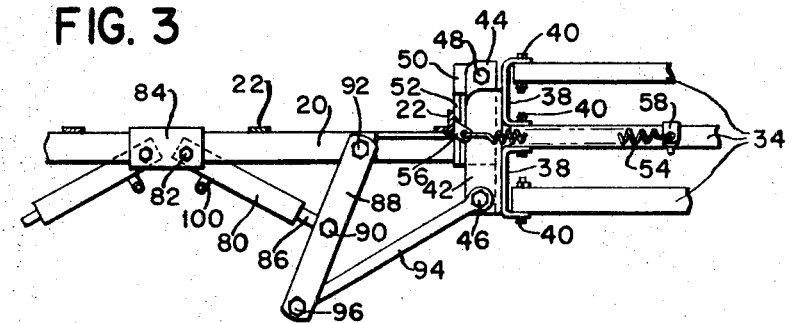
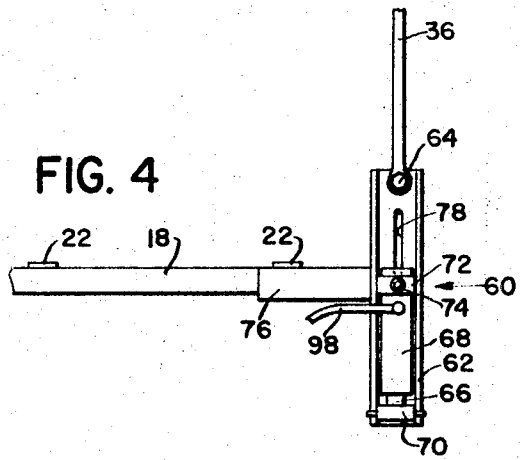
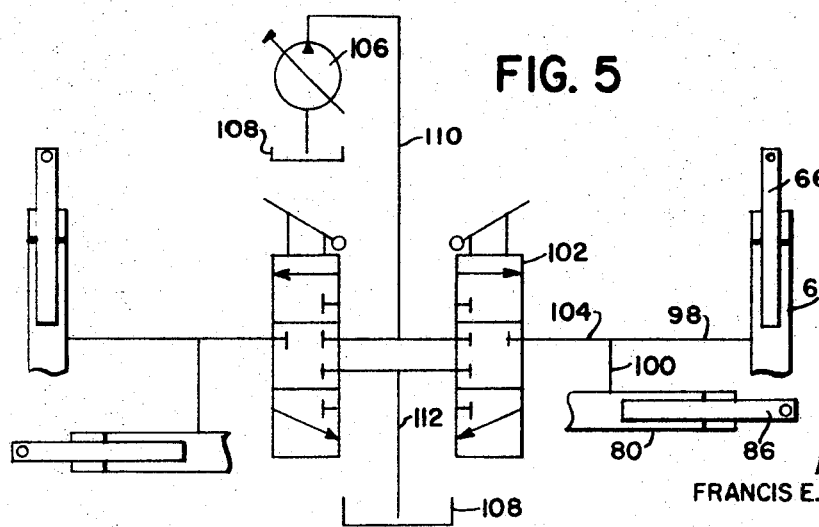

SPRAYER BOOM LEVELING AND FOLDING APPARATUS

BACKGROUND OF THE INVENTION

The present invention relates generally to sprayer booms, and more particularly relates to a novel control system for leveling and folding a sprayer boom which requires a single valve for each side of the boom.

Due to the extreme lengths now employed in sprayer booms, it has been found to be necessary to construct the booms from a plurality of sections, a center section being carried by a vehicle and the outer sections being pivotally mounted on the center section for movement between extended working positions and folded transport positions in which they extend generally longitudinally of the vehicle. The outer sections of the boom are also mounted for movement about a horizontal axis so that the outer ends of the boom can be raised and lowered. The folding of the outer boom sections to positions in which they extend generally longitudinally of the vehicle facilitates transport of the boom and the raising and lowering of the outer ends of the outer boom sections made it possible to level the boom with respect to the ground surface beneath the boom so that if the vehicle carrying the boom travels over on unlevel ground surface, one end of the boom will not be lowered to the point where the spray material is applied in narrow bands leaving untreated strips while the opposite end extends upwardly a sufficient distance to cause a great amount of spray drift. Each of the outer boom sections was provided with a hydraulic cylinder to fold the boom and a hydraulic cylinder to level the boom, with each of the hydraulic cylinders being connected to a separate directional flow control valve so that each of the outer boom sections could be independently folded or independently leveled. While such a system operated well in leveling and folding the boom, it necessarily involved a double lever control for each of the outer boom sections and was expensive to manufacture due to the number of directional flow control valves involved.

SUMMARY OF THE INVENTION

According to the present invention, the folding and leveling cylinders for each outer section of a multisection boom are connected in parallel to a single directional flow control valve so that operation of one valve will simultaneously control both cylinders. The axes about which either outer section moves when swinging between the extended and folded positions is tilted from the true vertical so that as the section is swung to the folded position its outer end will also be raised. Therefore, the folding cylinders are required to raise the outer boom sections as well as fold the outer boom sections and will have a higher load requirement than the leveling cylinders which are only required to raise the outer boom sections. As a result, the folding cylinder operates last in the raise and fold cycle and first in the unfold and lower cycle.

In order to increase the load on the folding cylinders to insure that they operate in the proper sequence with the leveling cylinders, the folding cylinders do not operate directly on the outer boom sections, but rather operate through a lever arm providing a negative mechanical advantage.

From the foregoing, it can be seen that the primary object of the present invention is to provide a hydraulic folding and leveling apparatus for the outer sections of a multisection sprayer boom which presents a single lever control for each of the outer boom sections.

An additional object of the present invention is to provide a hydraulic folding and leveling apparatus for multisection sprayer booms which has fewer parts and is simpler to operate than the folding and leveling apparatus heretofore known.

The above objects and additional objects and advantages will become apparent along with the details of construction of the preferred embodiment of the invention from a reading of the following detailed description when taken in conjunction with the accompanying drawings.

BRIEF DESCRIPTION OF THE DRAWINGS

In the drawings:

FIG. 3 is a view taken substantially along the line 3—3 of FIG. 2;

FIG. 4 is a view taken substantially along the line 4—4 of FIG. 2, but illustrating the parts as they would appear with the boom in its folded position; and FIG. 5 is a schematic view of the hydraulic system used to fold and level the boom illustrated in FIG. 1.

DESCRIPTION OF THE PREFERRED EMBODIMENT

Figure 1:
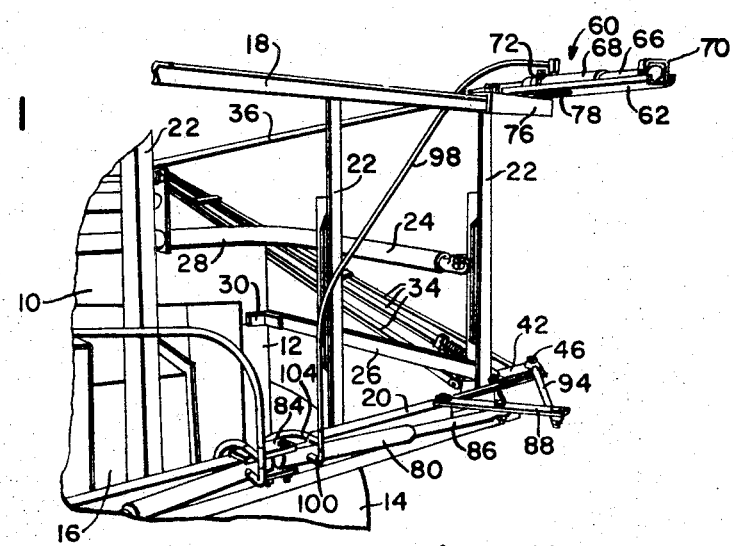
FIG. 1 is a fragmentary perspective view of a sprayer boom in its folded transport position.
Figure 2:
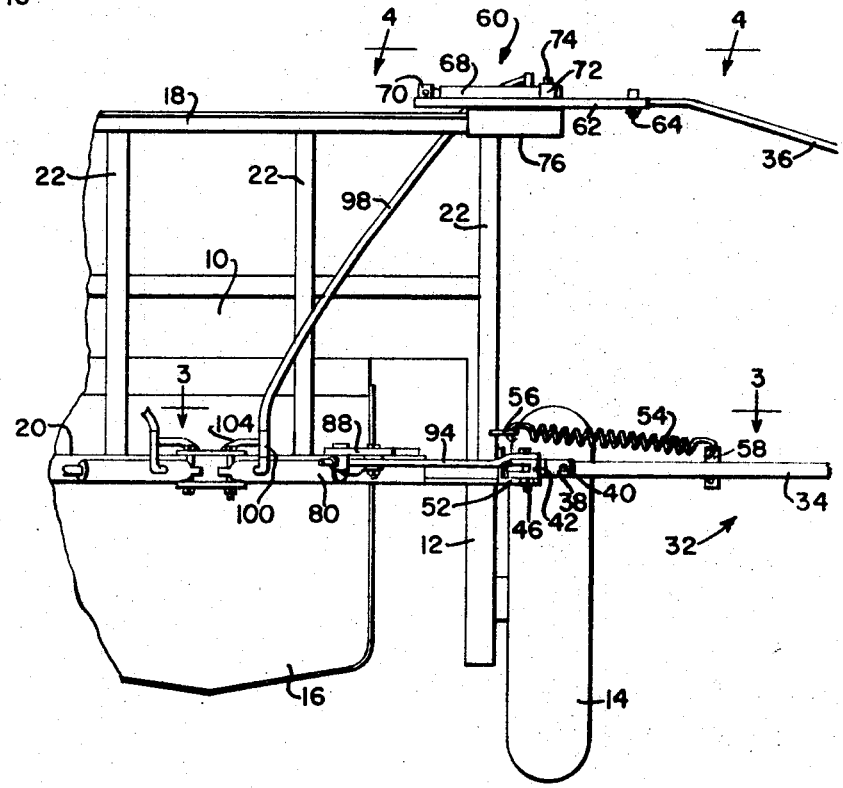
FIG. 2 is a fragmentary rear elevational view of the sprayer boom illustrated in FIG. 1, but with the boom extended.

In the following description and in the drawings, only one-half of a sprayer boom is described and illustrated, the other half being omitted for simplicity purposes since it is similar in all aspects to the disclosed half, and the description of the disclosed half also serves as a description of the undisclosed half.

Referring now to the drawings, a sprayer boom is illustrated as being mounted on the rear portion of a special spraying vehicle. The vehicle includes a transversely extending rear beam assembly 10 which can form an integral part of the vehicle chassis and a drip housing 12 secured to each of the outer ends of the beam assembly 10. The rear portion of the vehicle is carried by ground wheels 14 rotatably mounted on the lower portion of the drop housings while the forward portion of the vehicle is supported on an additional wheel (undisclosed) in any suitable manner. The vehicle also includes a solution tank 16 which is carried under and secured to the chassis in any suitable manner.

The boom includes a generally vertically extending main or center section made up of upper and lower transversely extending frame members 18 and 20 which are interconnected by a plurality of vertically extending frame members 22. The center section of the boom is secured to the vehicle through pairs of upper and lower arms 24 and 26 which form a parallel linkage. The inner ends of the arms 24 may be formed as an integral part of a rockshaft 28 and the inner ends of the arms 26 are pivotally secured to brackets 30 mounted on the drop housings 12. The outer ends of the arms 24 and 26 are pivotally secured to the outermost vertical frame members 22 so that by rotating the rockshaft 28 the entire boom is raised or lowered while maintaining a vertical attitude.

An outer boom section indicated generally at 32 includes lower boom members 34 and an upper boom member 36. The members 34 are spaced apart at their inner ends and converge inwardly toward their outer ends. A pair of U-shaped members 38 are pivotally secured to the inner ends of the lower boom members 34 by pivot bolts 40 and the bight portions of the U-shaped members 38 are secured to the bight of a channel member 42 in any suitable manner such as welding. The channel member 42 is pivotally mounted on the lower portion of the center section of the boom for movement about either one of a pair of generally vertical axes. To this end, a pivot arm 44 is mounted between the legs of the channel member 42 by a pivot bolt 46 which extends through the legs of the channel member 42 and through one end of the arm 44. The opposite end of the arm 44 extends beyond the channel member 42 and is pivotally mounted by a bolt 48 to an ear 50 which projects outwardly from a bracket 52 secured to the end of the lower transverse frame member 20 in any suitable manner. From the foregoing description, it can be seen that the lower members 34 of the outer boom section can pivot in a vertical plane about a horizontal axis defined by the pivot bolts 40, can be pivoted forwardly about a vertical axis defined by the pivot bolt 48, and can be pivoted rearwardly about a vertical axis defined by the pivot bolt 46. The outer boom section is normally maintained in an extended position with respect to the center section of the boom and biased against rotation about the axis defined by the pivot bolts 46 and 48 by a centering spring 54 which is tensioned between a bracket 56 secured to the outermost vertical frame member 22 and a bracket 58 secured to the center lower member of the outer boom section.

The upper member 36 of the outer boom section supports the outer ends of the lower members 34 and also serves to control their movement about the axis defined by the pivot bolts 40. To this end, the outer end of the upper member 36 is secured to the lower members 34 adjacent their outer ends and the inner end of the upper member 36 is secured to the upper portion of the center boom section through a leveling mechanism indicated generally at 60. The leveling mechanism 60 includes an elongated channel member 62 which has one of its ends secured to the inner end of the member 36 by a bolt 64. The opposite end of the channel 62 is secured to the rod 66 of a cylinder 68 through a bracket 70. The cylinder 68 is positioned within the channel member 62 and its anchor end is provided with a collar 72 which pivotally receives a pin 74 carried by an extension 76 of the upper transverse frame member 18. The pin 74 extends through a slot 78 provided in the bight portion of the channel member 62 so that be extending and retracting the cylinder 68, the channel member 62 is moved back and forth to raise and lower the outer end of the outer boom section about the axis defined by the bolts 40. The pin 74 defines an upper vertical pivot axis about which the upper member 36 of the outer boom section can swing as the lower members 34 of the outer boom section swing about either one of the pivot bolts 46 and 48. The extension 76 positions the pin 72 outwardly with respect to a vertical plane passing through the bolts 46 and 48 so that as the outer boom section is swung either to the front or rear, it will also be raised about the axis defined by the bolts 40.

Forward swinging movement of the outer boom section about the bolt 48 to a folded transport position is under the control of a hydraulic cylinder 80. The anchor end of the cylinder 80 is pivotally connected by a bolt 82 to a bracket 84 carried by the lower transversely extending frame member 20. The rod 86 of the cylinder 80 is secured to a lever 88 intermediate the ends thereof by a pivot bolt 90. One end of the lever 88 is pivotally secured to the lower transversely extending frame member 20 by a pin 92 while the opposite end of the lever 88 is pivotally connected to one end of a push rod 94 by a pivot pin 96. The other end of the push rod 94 is connected to the pivot bolt 46. When the cylinder 80 is extended, its movement is transmitted through the arm 88 and push rod 94 to the channel member 42 to pivot the outer boom section about the bolt 48. Since the cylinder 80 does not act directly on the outer boom section, but acts indirectly through the lever 88 and push rod 94, a greater fluid pressure is required within the cylinder 80 due to the force components lost within the linkage.

The cylinders 68 and 80 are connected in parallel by fluid lines 98 and 100, respectively, which in turn are connected to one side of a directional flow control valve 102 by an additional fluid line 104. The opposite side of the directional flow control valve 102 is connected to a fluid pump 106 and a fluid reservoir 108 by fluid lines 110 and 112 respectively. The valve 102, pump 106, and reservoir 108 are mounted on and form part of the special spraying vehicle upon which the boom is mounted.

The above-described folding and leveling apparatus for the multisection boom operates as follows. To move the outer boom section to its transport position, the operator merely moves the directional flow control valve 102 to the supply position in which it interconnects the pump 106 with the cylinders 68 and 80. Since the cylinder 68 acts directly on the outer boom section and is only required to lift the outer boom section while the cylinder 80 must fold the outer boom section about the bolt 48, raise the outer boom section due to the offset position of the pin 74 with respect to the bolt 48, overcome the force of the centering spring 54 and act through the lever 88 and push rod 94 which in effect provide a negative mechanical advantage, the cylinder 68 will operate first and will raise the outer boom section to the extent permitted by the length of its stroke. Once the cylinder 68 is fully extended, the cylinder 80 is extended to fold the boom to its transport position alongside the vehicle as illustrated in FIG. 1. To return the boom to its extended position, the control valve 102 is moved to its exhaust position in which it interconnects the cylinders 68 and 80 with the reservoir 108. With the fluid pressure exhausted from the cylinders 68 and 80, the weight of the outer boom section will tend to unfold the outer boom section and also to lower its outer end by pivoting about the axis defined by the bolts 40. However, the force of the centering spring 54 also tends to move the outer boom section to its extended position so that the forces tending to extend the outer boom section are greater than the forces tending to lower the outer boom section about the axis defined by the bolts 40. Therefore, the outer boom section 32 is first extended and the cylinder 80 is first moved to its retracted position. After the outer boom section 32 has been extended, the cylinder 68 will then be retracted and the outer boom section lowered until the valve 102 is moved from the exhaust position. During use, the operator can raise and lower the outer boom section to maintain it substantially parallel to the ground surface beneath the outer boom section by moving the control valve 102 to the supply and exhaust positions. During the leveling operation, the boom does not fold due to the greater pressure required in the cylinder 80 to extend its rod 86.

Should the outer end of the boom strike an obstruction during forward movement, the outer section is free to pivot rearwardly about the bolt 46 so that the boom is not damaged. As soon as the obstruction has been cleared, the centering spring 54 will return the outer section to its extended position.

While a single preferred embodiment of the invention has been illustrated and described, various modifications thereof will become apparent to those skilled in the art without departing from the underlying principles of the invention.

I claim:

1. Spraying apparatus comprising: a vehicle; a transversely extending mounting frame carried at one end of the vehicle and having upper and lower portions; a boom having inner and outer ends; means pivotally connecting the inner end of the boom to the lower portion of the frame for pivotal movement about generally horizontal and vertical axes; a boom-supporting member having inner and outer ends; the outer end of the supporting member being connected to the boom remotely from the inner end thereof; means pivotally connecting the inner end of the member to the upper portion of the frame for movement about a vertical axis; means including a hydraulic cylinder for varying the effective length of the member to thereby raise and lower the outer end of the boom by pivoting the boom about the horizontal axis; a second hydraulic cylinder operatively connected between the frame and boom to swing the boom about the vertical axes between extended and folded positions; and means connecting the cylinders in parallel and selectively to a source of fluid pressure and a fluid reservoir.

2. The spraying apparatus set forth in claim 1 wherein the upper vertical axis is positioned outwardly of the lower vertical axis with respect to the transverse end of the frame whereby movement of the boom from the extended position to the folded position is accompanied by a raising of the outer end of the boom.

3. The spraying apparatus set forth in claim 2 wherein the second hydraulic cylinder is connected to the boom through linkage means providing a negative mechanical advantage.

4. The spraying apparatus set forth in claim 3 further including means normally biasing the boom to the extended position.

5. The spraying apparatus set forth in claim 4 wherein the hydraulic cylinders are single-acting extensible and retractable cylinders.

6. Spraying apparatus comprising: a vehicle; a multisection boom including a main section mounted on one end of the vehicle and an outer section; the main section extending transversely of the vehicle and having upper and lower portions; the outer section having inner and outer ends with the inner end having upper and lower portions; means mounting the lower portion of the outer section to the lower portion of the main section for pivotal movement about generally horizontal and vertical axes; hydraulically controlled extensible and retractable means pivotally mounted on the upper portion of the main section for movement about a generally vertical axis positioned transversely outwardly of the lower generally vertical axis; the last-mentioned means being connected to the upper portion of the outer section; extensible and retractable hydraulic cylinder means operatively connected between the main and outer sections for swinging the outer section about the vertical axes between extended and folded positions; and means connecting the hydraulically controlled means and the cylinder means in parallel and selectively to a source of fluid pressure and a fluid reservoir.

7. The spraying apparatus set forth in claim 6 wherein the hydraulically controlled extensible and retractable means includes a link means slotted intermediate its ends; pivot pin means carried by the upper portion of the main section and extending upwardly through the slotted link means, a second hydraulic cylinder means connected between the pin and one end of the slotted link means, and the other end of the slotted link means being connected to the upper portion of the outer section.

8. The spraying apparatus set forth in claim 7 wherein the first-mentioned hydraulic cylinder means is operatively connected to the outer section of linkage means providing a negative mechanical advantage.

9. The spraying apparatus set forth in claim 8 further including means normally biasing the outer section to the extended position.

10. Spraying apparatus comprising: a vehicle; a multisection boom including a main section mounted on one end of the vehicle for generally vertical movement and an outer section; the main section extending transversely of the vehicle and having upper and lower portions; the outer section having inner and outer ends with the inner end having upper and lower portions; means mounting the lower portion of the outer section to the lower portion of the main section for pivotal movement about a generally horizontal axis and about either one of a pair of spaced generally vertical axes positioned on opposite sides of the plane of the main section; extensible and retractable means pivotally mounted on the upper portion of the main section for movement about a generally vertical axis positioned transversely outwardly of and longitudinally medially of the pair of lower vertical axes; the last-mentioned means being connected to the upper portion of the outer section and including an extensible and retractable hydraulic cylinder; an additional extensible and retractable hydraulic cylinder operatively connected between the main section and the outer section to swing the outer section about one of the pair of lower vertical pivots between extended and folded positions while permitting the outer section to swing about the other of the pair of lower vertical pivots between extended and breakaway positions; and means connecting the cylinders in parallel and selectively to a source of fluid pressure and a fluid reservoir.

11. The spraying apparatus set forth in claim 10 wherein the additional cylinder means has one end connected to the main section and the other end pivotally connected to a lever intermediate the ends thereof, the lever having one end pivotally connected to the main section and its other end pivotally connected to one end of a push rod whose opposite end is pivotally connected to the outer section for movement about the other of the pair of lower vertical pivots.

12. The spraying apparatus set forth in claim 11 further including means biasing the outer section toward the extended position from both the folded and breakaway positions.